Figure 1:
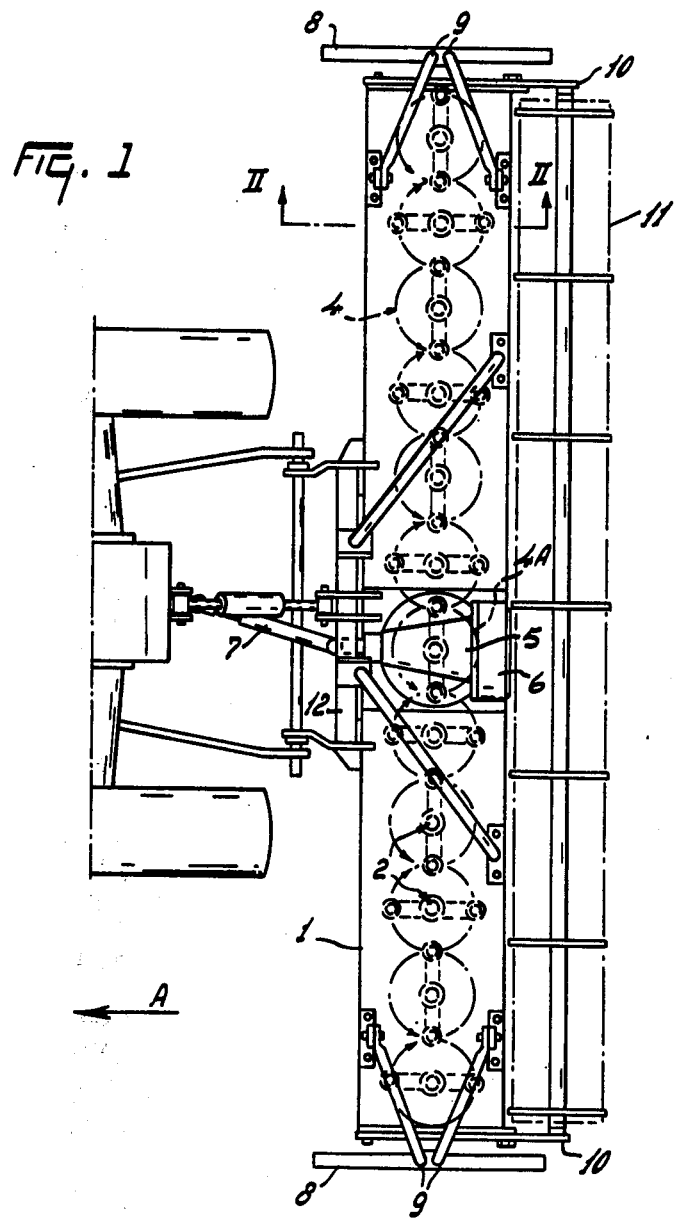

United States Patent [19]

van der Lely

[11] 4,153,115
[45] May 8, 1979

[54] ROTARY HARROWS

[76] Inventor: Cornelis van der Lely, 7, Brüschenrain, Zug, Switzerland

[21] Appl. No.: 776,356

[22] Filed: Mar. 10, 1977

Related U.S. Application Data

[63] Continuation of Ser. No. 590,580, Jun. 26, 1975, abandoned.

[51] Int. Cl.² .............................................. A01B 9/00
[52] U.S. Cl. ....................................... 172/59; 64/29; 172/111; 403/DIG. 7
[58] Field of Search ......................... 172/59, 111, 125; 403/DIG. 7; 64/29; 56/10.3

[56] References Cited

U.S. PATENT DOCUMENTS

| | | | |
|---|---|---|---|
| 861,143 | 7/1907 | Scott | 403/DIG. 7 |
| 1,697,677 | 1/1929 | Davidson | 172/59 |
| 2,685,160 | 8/1954 | Kuhary et al. | 56/10.3 |
| 3,050,923 | 8/1962 | Sanderson | 64/29 X |
| 3,596,446 | 8/1971 | Bryan | 56/10.3 |
| 3,667,250 | 6/1972 | Schnepel | 64/29 |
| 3,713,494 | 1/1973 | Berdrin | 172/59 |
| 3,821,989 | 7/1974 | Lely et al. | 172/59 |
| 3,899,030 | 8/1975 | Lely et al. | 172/59 X |

FOREIGN PATENT DOCUMENTS 458501 3/1928 Fed. Rep. of Germany ............. 172/59

*Primary Examiner*—Paul E. Shapiro
*Attorney, Agent, or Firm*—William B. Mason; Penrose Lucas Albright

[57] ABSTRACT

A cultivator or rotary harrow has tined soil working members that are driven about upwardly extending axes. At least one, but preferably substantially all, of the soil working members have an overload release between the driving system and the tines so that when an immovable object is encountered by a tine, the drive to the respective soil working member is temporarily disconnected. The release can be between two parts that are normally spring biased together to maintain the driving engagement to the soil working member. In one form, a pinion gear to the soil working member has an outer toothed portion that can rotate relative to a central portion that is connected to the rotary shaft mounting the soil working member. Ball members in channels formed in the central portion are biased radially into recesses of the toothed portion. In another form, ball members are biased radially to engage the soil working member to its corresponding rotary shaft. Also, the upper end of the rotary shaft can be secured to a pinion by a split ring held in a spacing sleeve. The lower shaft end can be attached to a tine support and normally connected for rotation by a lower part that is fitted in a recessed part in the bottom of the support and spring biased in the recess. Upon a tine striking an immovable object, the parts ride out of engagement, but the parts reconnect upon passing the object.

5 Claims, 7 Drawing Figures

ROTARY HARROWS

This application is a continuation of Ser. No. 590,580 filed June 26, 1975, now abandoned.

According to one aspect of the invention, there is provided a soil cultivating implement or rotary harrow of the kind set forth, wherein at least one of said soil working members is provided with its own individual overload release or slip coupling.

Figure 2:
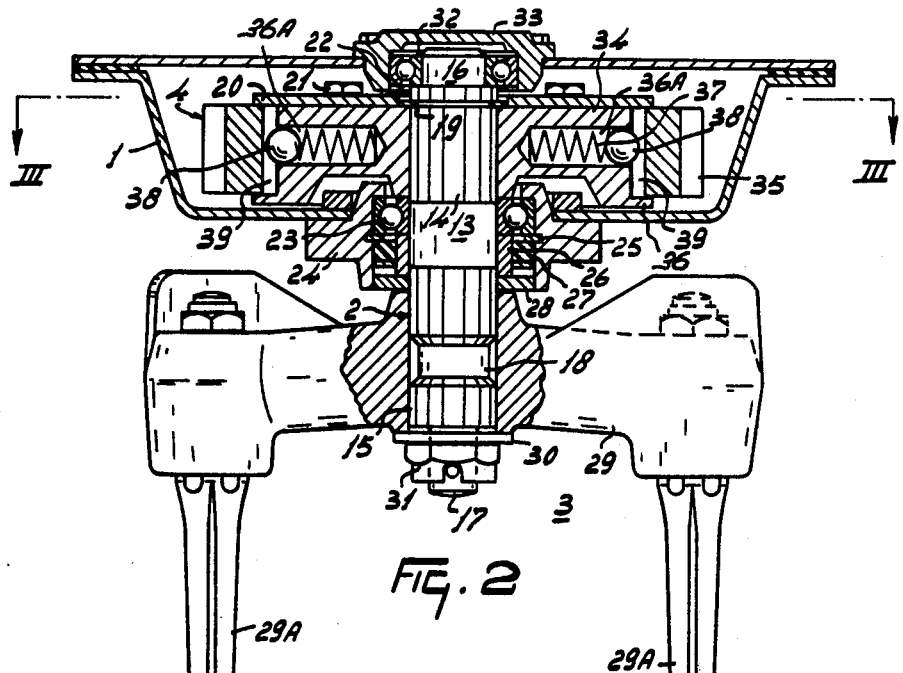
Figure 3:
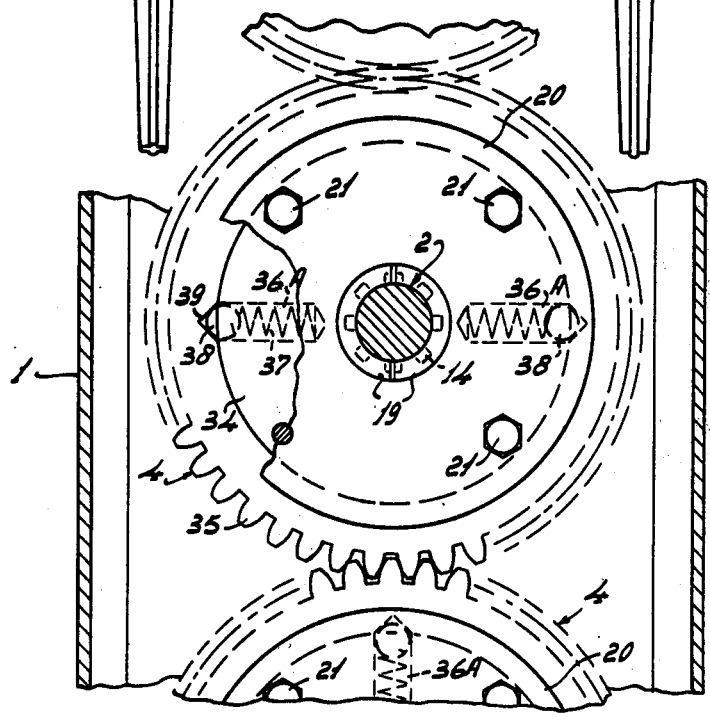
Figure 4:
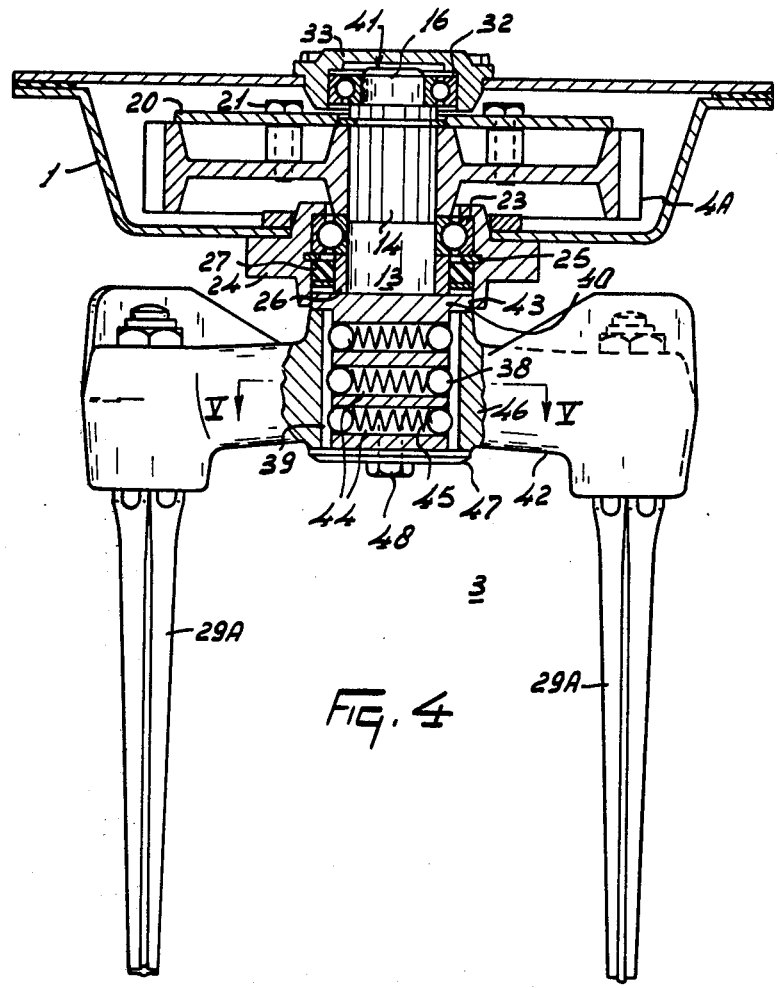
Figure 5:
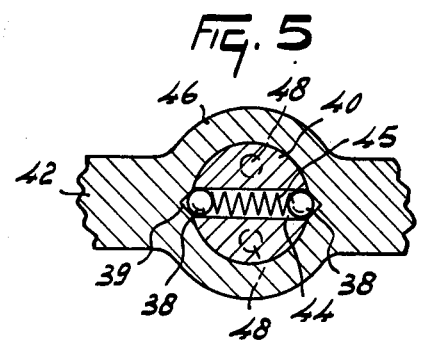
Figure 6:
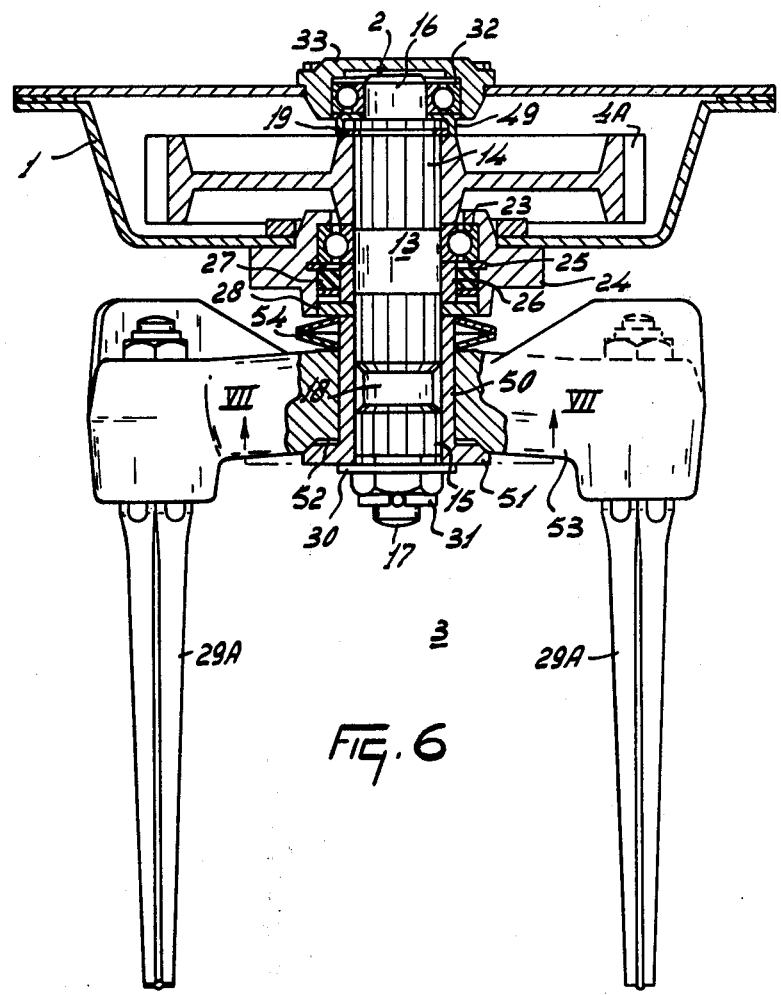
Figure 7:
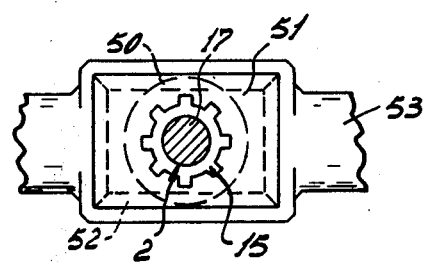

For a better understanding of the invention, and to show how the same may be carried into effect, reference will now be made, by way of example, to the accompanying drawings, in which:

FIG. 1 is a plan view of a soil cultivating implement or rotary harrow in accordance with the invention connected to the rear of an agricultural tractor, FIG. 2 is a part-sectional elevation, to an enlarged scale, the section being taken on the line II—II in FIG. 1, FIG. 3 is a section taken on the line III—III in FIG. 2, FIG. 4 is a similar view to FIG. 2 but illustrates an alternative or additional construction, FIG. 5 is a section taken on the line V—V in FIG. 4, FIG. 6 is a view similar to FIG. 2 but shows a further alternative or additional construction, and FIG. 7 is a section taken on the line VII—VII in FIG. 6.

Referring to FIGS. 1 to 3 of the drawings, the soil cultivating implement or rotary harrow that is illustrated therein will hereinafter be referred to, throughout the remaining descriptive portion of this Specification, merely as a "rotary harrow" for the sake of brevity. The rotary harrow comprises a frame portion 1 in the form of a hollow box-shaped beam that extends substantially horizontally transverse, and normally substanially horizontally perpendicular, to the intended direction of operative travel of the harrow that is indicated by an arrow A in FIG. 1 of the drawings. A plurality (in this case twelve) of upwardly extending, and normally vertical or substantially vertical, shafts 2 are rotatably journalled in upper and lower walls of the hollow frame portion 1 at regularly spaced apart intervals. The distances between the longitudinal axes of immediately neighbouring shafts 2 should not be greater than 30 centimeters and it is preferred that said distances should have magnitudes of substantially 25 centimeters. Each shaft 2 projects from beneath the bottom or lower wall of the frame portion 1 and is there provided with a corresponding soil working member 3. Each of the shafts 2 is provided, inside the hollow frame portion 1, with a corresponding straight- or spur-toothed pinion 4 or 4A so that there is a single row of twelve pinions 4 and 4A which are arranged in such a way that the teeth of each pinion are in mesh with the teeth of its neighbour, or both of its neighbours, in that row. The construction and arrangement of the pinions 4 and 4A will be described in further detail below. One of the center pair of the row of twelve shafts 2 has an upward extension into a gear box 5 that is mounted on top of the frame portion 1. The shaft extension is provided, inside the gear box 5, with a bevel pinion whose teeth are in mesh with those of a further bevel pinion carried by a substantially horizontal shaft that is substantially parallel to the direction A. The rearmost splined end of the substantially horizontal shaft is located inside a change-speed gear 6 together with the rearmost splined end of an overlying and parallel shaft whose leading splined or otherwise keyed end projects forwardly from the front of the gear box 5 in substantially the direction A. Straight- or spur-toothed pinions of different sizes are provided for exchangeable and/or interchangeable mounting in co-operating pairs on the splined portions of the two shafts that project rearwardly into the change-speed gear 6. The transmission ratio between those two shafts is determined by employing appropriate pinions so that the speed of rotation of the soil working members 3, during the operation of the harrow, can be increased or decreased without having to alter the input speed of rotation applied to the gear box 5. An intermediate telescopic transmission shaft 7 that is of a construction which is known per se, having universal joints at its opposite ends, is employed to place the power take-off shaft of an agricultural tractor or other vehicle to which the harrow is coupled during its use in driving connection with the end of the shaft which projects forwardly from the front of the gear box 5.

Substantially vertically disposed shield plates 8 extend substantially parallel to the direction A at locations immediately beyond the opposite ends of the frame portion 1 and its row of soil working members 3. A lower edge region of each shield plate 8 is slidable over the ground surface and both shield plates 8 are carried by corresponding pairs of arms 9 which are turnable about substantially horizontal pivots mounted on top of the frame portion 1 so as to define axes that extend substantially horizontally parallel to the direction A. Thus, each shield plate 8 can turn upwardly and downwardly during operation of the harrow, about the pivotal connections of the corresponding arms 9 to the frame portion 1, to match undulations in the surface of the ground. The opposite ends of the hollow frame portion 1 are closed by substantially vertical plates and arms 10 are turnable upwardly and downwardly alongside those plates about a substantially horizontal axis which extends substantially perpendicular to the direction A and which is afforded by strong aligned pivots that are located at the tops and fronts of the frame portion end plates with respect to the direction A. Rearmost edge regions of said end plates are formed with arcuately curved slots, or with arcuately curved rows of holes, and single holes in the arms 10 register with said slots or can be brought into register with chosen ones of the alternative holes. Bolts are provided for entry through the single holes in the arms 10 and through the registering slots or chosen registering holes in the frame portion end plates and said bolts can be tightened to maintain the arms in chosen angular settings about the axis defined by the aligned pivotal connections of the arms 10 to the frame portion 1. A rotatable supporting member in the form of an open ground roller 11 is rotatably mounted between bearings disposed at the lowermost and rearmost ends of the arms 10 and it will be realised that the angular settings of the arms 10 that are chosen relative to the frame portion 1 determine the level of the axis of rotation of the roller 11 relative to that frame portion and thus dictate the depths to which tines 29A of the soil working members 3 can penetrate into the ground surface during the use of the harrow. The front of the frame portion 1 with respect to the direction A is provided, midway across the width thereof, with a generally triangular coupling member or trestle 12 which has coupling points that are constructed and arranged for connection to the three-point lifting device or hitch at the rear of an operating agricultural tractor or other vehicle in the manner which is illustrated in outline in FIG. 1 of the drawings and which is known per se.

FIG. 2 of the drawings illustrates the construction and mounting of one of the soil working members 3 and its shaft 2 in greater detail and it will be seen from FIG. 2 that the illustrated shaft 2 has a substantially central plain portion 13 above and beneath which there are splined portions 14 and 15 respectively. The upper splined portion 14 terminates in an upper plain stub shaft 16 and the lower splined portion 15 terminates in a lower screwthreaded stub shaft 17, the stub shafts 16 and 17 being of smaller diameter than that of the remainder of the shaft 2. The lower splined portion 15 is, however, formed substantially midway along its length with a part 18 of reduced diameter, by means of which the manufacturing of the shaft 2 can be simplified. A narrow groove is formed in the upper splined portion 14 close to the integral junction of that portion with the upper plain stub shaft 16 and said groove accommodates a ring 19 which, as can be seen in FIG. 3 of the drawings, is afforded by two separate but identical half ring segments that are arranged with their internal concave curved edges in the groove. The ring 19 serves as a locking member to maintain the corresponding pinion 4 in its appointed position on the shaft 2 which it does by abutting against the upper end of the hub of the pinion, the lower end of that hub being substantially coincident with the junction between the central plain portion 13 of the shaft 2 and its upper splined portion 14. An annular plate 20 is secured by four bolts 21 to the upper surface of the illustrated pinion 4, the central opening 22 in said plate 20 engaging around the outer convex curved surface of the ring 19 to ensure that said ring is maintained in its operative position in the co-operating groove.

A lower ball bearing 23 has its inner race arranged around the central plain portion 13 of the shaft 2, said bearing 23 being enclosed in a housing 24 which is secured in a corresponding opening in the lower wall or bottom of the frame portion 1 by bolts that are not visible in the drawings. A circlip 25 co-operates with a groove in an internal cylindrically curved surface of the housing 24 and maintains the bearing 23 in its appointed position axially of that housing. A spacing sleeve 26 surrounds the shaft 2 beneath the inner race of the bearing 23 and extends between that inner race and a locking ring 28 that surrounds the shaft 2 in closing relationship with the bottom of the bearing housing 24. As can be seen in FIG. 2 of the drawings, the locking ring 28 is arranged just inside the otherwise open bottom end of the housing 24. An oil seal 27 has its internal surface in surrounding relationship with the spacing sleeve 26 and its external surface in abutting relationship against the housing 24, said oil seal 27 being arranged immediately beneath the circlip 25. The top of a central hub of a tine or other tool support 29 bears against the lower surface of the locking ring 28, said central hub being internally splined for co-operation, as illustrated, with the lower splined portion 15 of the shaft 2. The opposite ends of the tine or other tool support 29 comprise substantially vertically disposed and substantially cylindrical holders in which fastening portions of the aforementioned tines 29A, or of other tools, are firmly but releasably received. The soil working member 3 that is illustrated in FIG. 2 of the drawings has two of the tines 29A arranged in diametrically opposed relationship in the two holders, both tines extending downwardly from their holders in parallel, or approximately parallel, relationship with the longitudinal axis of the corresponding shaft 2 which axis is also the axis of rotation of the soil working member 3 concerned. The lower end of the central hub of the tine or other tool support 29 bears against a washer 30 that surrounds the lower screwthreaded stub shaft 17 of the shaft 2 and the assembly is maintained in a substantially rigid condition, in which it is nevertheless rotatable about the axis of the shaft 2, by a fastening nut 31 that is screwed onto the stub shaft 17 and into tight engagement with the lower surface of the washer 30. A split pin or the like is entered through a transverse bore in the stub shaft 17 to prevent the nut 31 from working loose. An upper ball bearing 32 has its inner race in surrounding relationship with the upper plain stub shaft 16 and its outer race received in a closed housing 33 which is releasably secured in a corresponding opening in the upper wall or top of the frame portion 1 by bolts whose heads are visible in FIG. 2 of the drawings. It will be appreciated that the assembly which comprises the tine or other tool support 29, the spacing sleeve 26 and the pinion 4 is secured in its appointed position between the opposite ends of the corresponding shaft 2 by the ring 19 and the fastening nut 31.

The pinion 4 that is illustrated in detail in FIGS. 2 and 3 of the drawings comprises a central portion 34 that is internally splined and secured to the portion 14 of the corresponding shaft 2 in the manner that has been set forth above. A separate circumferential part 35 is rotatable around the periphery of the central portion 34 and is provided on its external surface with the straight or spur teeth of the pinion. The circumferential part 35 is retained between a lower guide in the form of a lip 36 of the central portion 34 and an upper guide in the form of an outer circumferential region of the corresponding annular plate 20. The central portion 34 is formed with two diametrically opposed substantially radial bores 36A each of which accommodates a corresponding helical compression spring 37 that bears between the radially inner closed end of the bore 36A concerned and a locking ball 38 that tends to be urged out of the radially outer open end of the bore 36A by said spring. The balls 38 normally engage in corresponding recesses 39 that are formed in the internal curved wall of the circumferential part 35. The spring-loaded locking balls 38 form parts of an overload release or slip coupling between the circumferential part 35 and the central portion 34 of the pinion 4. When the balls 38 are pushed inwardly into the bores 36A, against the action of the springs 37, the circumferential part 35 can rotate around the central portion 34 through 180° until the interchanged bores 36A again come into register with the recesses 39. If the resistance to rotation of the central portion 34 is then still above a predetermined value, the circumferential part 35 will continue to rotate relative to the central portion 34 until the obstacle or high resistance to rotation of that portion 34 is removed or reduced below said predetermined value. It will be noted from FIGS. 2 and 3 of the drawings that the longitudinal axes of the two bores 36A are substantially parallel to the longitudinal axis of the corresponding tine or other tool support 29.

In the embodiment which has just been described, the shaft 2 which has an upward extension into the gear box 5 carries a pinion 4A which is of unitary construction, that is to say, it does not have a central portion 34 and a separate circumferential part 35 as do the remaining eleven pinions 4. The single unitary pinion 4A is, however, of the same overall size as are the pinions 4 and has the same number of teeth as do the pinions 4. The reason for the provision of the unitary pinion 4A in respect of the upwardly extending shaft 2 that co-operates with the gear box 5 is that, if it were replaced by one of the pinions 4, the operation of the overload release or slip coupling thereof would stop the rotation of all the other eleven soil working members 3 since it will be appreciated that it is by way of the single unitary pinion 4A that rotary drive is transmitted to all of the other eleven pinions 4. If the rotation of one of the eleven soil working members 3 that correspond to the eleven pinions 4 should be stopped, the corresponding overload release or slip coupling will become effective and the other soil working members 3 will continue to rotate. Two alternative forms of overload release or slip coupling will be described below and, if desired, one of those overload releases or slip couplings may be provided between the single unitary pinion 4A and the corresponding soil working member 3.

In FIGS. 4 and 5 of the drawings, and also in FIGS. 6 and 7 thereof, parts that are similar, or identical, to parts that have already been described are indicated by the same references as are employed in FIGS. 1 to 3 of the drawings. In the embodiment in FIGS. 4 and 5 of the drawings, each soil working member 3 incorporates a corresponding overload release or slip coupling which is arranged between a portion 40 of a corresponding shaft 41 that embodies the axis of rotation of the soil working member 3 concerned and a corresponding tine or other tool support 42. The illustrated shaft 41 is rotatably mounted in the frame portion 1 in the same manner as in the shaft 2 shown in FIGS. 2 and 3 of the drawings but its upper splined portion 14 is provided with a corresponding unitary pinion 4A rather than with one of the pinions 4 that incorporates an overload release or slip coupling. The lower shaft portion 40 has a flange 43 at its upper end in adjoining relationship with the central plain portion 13 of the shaft 41. The shaft portion 40 is provided, beneath the flange 43, with three diametrically extending bores 44 that are in spaced superposed parallel relationship, each bore 44 also extending, when the overload release or slip coupling is operatively engaged, parallel or substantially parallel to the longitudinal axis of the tine or other tool support 42. Each bore 44 accommodates a corresponding helical compression spring 45 which bears between two of the locking balls 38 that are located at opposite ends of the bore 44 concerned, normally being partially entered, by spring pressure, in two diametrically opposed recesses 39 that are formed in the internal otherwise cylindrically curved wall of a cylindrical hub 46 of the support 42. The upper end of the hub 46 abuts against the lower surface of the flange 43 and its lower end abuts against a circular locking or retaining plate 47 that is secured to the bottom of the shaft portion 40 by two bolts 48.

If one or both of the tines 29A should, during the operation of the harrow, encounter an immovable obstacle or meet a resistance to rotation which is above a predetermined value, the springs 45 will be compressed to an extent which is such that the balls 38 will ride out of the recesses 39 and the shaft 41 will rotate inside the hub 46 without driving the soil working member 3. As soon as the obstacle has been avoided or removed, or when the resistance to rotation of the soil working member 3 falls below said predetermined value, the springs 45 will be able to re-engage the balls 38 in the recesses 39 and re-commence rotation of the soil working member 3. It will be appreciated that the overload release or slip coupling will automatically tend to re-engage itself twice during each complete revolution of the shaft 41 relative to the hub 46 of the support 42.

FIGS. 6 and 7 of the drawings illustrate a further alternative or additional construction in which the shafts 2 are again employed. However, in the embodiment of FIGS. 6 and 7 of the drawings, the two parts of the ring 19 are maintained in their appointed position by the downwardly directed rim of a spacing member 19 which is located on the upper plain stub shaft 16 immediately beneath the upper ball bearing 32, said rim embracing the outer convex curved edges of the two half rings that afford the ring 19. The lowermost edge of the rim of the member 49 bears against the top of the hub of the corresponding unitary pinion 4A. The lower splined portion 15 of the illustrated shaft 2 is surrounded by a matchingly splined sleeve 50 which bears between the lower surface of the locking ring 28 and the upper surface of the corresponding washer 30. The lowermost end of the sleeve 50 integrally carries an oblong member 51 whose four bevelled edges bear against matchingly bevelled edges of an oblong recess 52 at the bottom of the hub of a corresponding tine or other tool support 53. The hub of the support 53 would be turnable around the external surface of the sleeve 50 if it were not for the provision of the interengaging member 51 and recess 52 and it will be seen from FIG. 6 of the drawings that a pair of opposed cup springs 54 are arranged around the upper end of the sleeve 50, between the locking ring 28 and the hub of the support 53, in such a way as to urge the support 53 axially downwards along the sleeve 50 thus maintaining the overload release or slip coupling that is afforded principally by the parts 51 and 52 in operative engagement. When the soil working member 3 concerned meets an immovable obstacle or encounters a resistance to its rotation which is above a predetermined value, the support 53 and the tines 29A which it carries are displaced axially upwards along the sleeve 50 to a small extent thus compressing the cup springs 54 and allowing the oblong member 51 to revolve, with the shaft 2, in the oblong recess 52. The overload release or slip coupling remains disengaged until the obstacle is removed or avoided or until the resistance to rotation of the soil working member 3 falls below said predetermined value. The springs 54 are then able to re-assume substantially the position thereof that is illustrated in FIG. 6 thus re-engaging the overload release or slip coupling.

In the use of the rotary harrow that has been described with reference to FIGS. 1 to 3 of the drawings, its coupling member or trestle 12 is connected to the three-point lifting device or hitch at the rear of an agricultural tractor or other operating vehicle and the intermediate telescopic transmission shaft 7 is employed to place the power take-off shaft of that tractor or other vehicle in driving connection with the splined or otherwise keyed end of the shaft that projects forwardly in substantially the direction A from the front of the gear box 5. Appropriate pinions are arranged in the change-speed gear 6 to give a speed of rotation of the soil working member 3 that is suitable for the nature and condition of the soil that is to be cultivated bearing in mind that a more or less constant input speed of rotation will be applied to the gear box 5 from the power take-off shaft of the tractor or other operating vehicle. As the harrow is moved operatively over the ground in the direction A, the eleven pinions 4 and single pinion 4A will rotate in the alternately opposite directions that are indicated by arrows in FIG. 1 of the drawings carrying with them the underlying soil working members 3. The previously established angular settings of the arms 10 relative to the frame portion 1 determine the level of the axis of rotation of the roller 11 relative to the remainder of the harrow and thus the depths to which the tines 29A can penetrate into the soil. Each soil working member 3 has its own individual overload release or slip coupling which is located in the immediate proximity of the axis of rotation of that soil working member. When embodiments in accordance with FIGS. 4/5 or 6/7 of the drawings are employed, the corresponding overload release or slip couplings are located between the shafts that embody the axes of rotation and parts carried by those shafts. Actually, the overload release or slip couplings may be arranged either between parts of the drive transmission and the shafts that embody the axes of rotation of the soil working members as in the embodiment of FIGS. 1 to 3 of the drawings or between said shafts and the corresponding tine or tool supports as in the embodiments of FIGS. 4 to 7 of the drawings. The embodiment of FIGS. 1 to 3 of the drawings is a combination of these two arrangements because, as has been explained above, a single one of the shafts 2 is associated with an overload release or slip coupling of one of the two kinds that have been described with reference to FIGS. 4/5 and 6/7 of the drawings whereas the remaining overload release or slip couplings are provided in accordance with FIGS. 2 and 3 of the drawings. In all three different embodiments of overload release or slip coupling that have been described, the parts that rotate relative to one another when an immovable obstacle is met with, or when the resistance to rotation exceeds a predetermined value, can perform such relative rotation freely through 180° after which the overload release or slip coupling automatically tends to become re-engaged and will do so when the obstacle has been removed or avoided or when the resistance to rotation has fallen beneath the predetermined value.

FIG. 1 of the drawings shows that, during normal operation, the tine or other tool supports 29, 42 or 53 of immediately neighbouring soil working members 3 are turned through substantially 180° relative to one another about the axes of the corresponding shafts 2 or 41. This prevents the tines 29A or other tools from fouling each other during operation and it will be realised that the "engaged" positions of the corresponding overload release or slip couplings are similarly angularly offset around the axes of rotation of immediately neighbouring soil working members. Thus, after one of the overload release or slip couplings has been temporarily disengaged and is subsequently re-engaged, the support 29, 42 or 53 concerned will re-adopt its correct angular setting about the corresponding axis of rotation. The number of "engaged" positions per complete shaft rotation is the same as the number of tines 29A per corresponding support 29, 42 or 53. While it is preferred that all of the soil working members 3 should have their own individual overload release or slip couplings, this is not essential and it is noted that it is within the scope of the invention to provide a smaller number than the total number of soil working members 3 with corresponding overload release or slip couplings. If desired, only one of the soil working members 3 may be provided with a corresponding overload release or slip coupling.

Although certain features of the different embodiments of the soil cultivating implement or rotary harrow that have been described, and/or that are illustrated in the accompanying drawings, will be set forth in the following claims as inventive features, it is emphasised that the invention is not necessarily limited to those features and that it includes within its scope each of the parts of each soil cultivating implement or rotary harrow embodiment that has been described and/or that is illustrated in the accompanying drawings both individually and in various combinations.

What we claim is:

1. A rotary harrow comprising a frame and a plurality of soil working members mounted on a transverse hollow frame portion of said frame, said members being positioned in a transverse row and rotatably mounted on substantially vertical shafts, at least one of said shafts mounting an upper toothed pinion and a lower tool support, the toothed pinions of immediately adjacent shafts being housed within said frame portion and drivably interconnected to one another, said one pinion being secured in position on a corresponding shaft by an encircling ring that comprises two cooperating curved locking parts fitted in groove means in said shaft, said parts extending beyond the groove means and bearing on the upperside of said pinion, said ring parts being surrounded by a spacing sleeve member surrounding said shaft, upper and lower sides of said sleeve member abutting a bearing on said shaft and said pinion, respectively, the lower side said pinion abutting a further bearing on the shaft, housing means on said frame portion holding the further bearing in position against vertical movement relative to the frame portion, and means clamping said support between the further bearing and fastening means on the lower end of said shaft, means acting between the lower surface of said further bearing and the fastening means for preventing vertical movement of said shaft relative to said further bearing.

2. A rotary harrow comprising a frame and a plurality of soil working members mounted on a transverse hollow frame portion of said frame, said members being positioned in a transverse row and rotatably mounted on substantially vertical shafts, at least one of said shafts mounting an upper toothed pinion and a lower tool support, the toothed pinions of immediately adjacent shafts being housed within said hollow frame portion and drivably interconnected to one another, said pinion being secured in position on a corresponding shaft by an encircling ring that comprises two cooperating and substantially identical locking parts fitted in a groove that encircles said shaft, said parts extending beyond the groove and bearing on the upperside of said pinion, said ring parts being surrounded by a cylindrical spacing sleeve member that also surrounds said shaft, upper and lower sides of said sleeve member abutting an upper bearing on said shaft and said toothed pinion, respectively, the lower side said pinion abutting a lower bearing on the shaft and housing means on said frame portion holding the lower bearing in position against vertical movement relative to the frame portion and overload means releasably clamping said support between said lower bearing and fastening means on the lower end of said one shaft, sleeve means slidably positioned on said shaft between the lower surface of said lower bearing and said fastening means for preventing vertical movement of said shaft relative to said lower bearing.

3. A harrow as claimed in claim 2, wherein said first mentioned bearing is positioned adjacent the upper end of said shaft and said spacing member has a lower rim that abuts a hub of said pinion.

4. A harrow as claimed in claim 2, wherein at least one spring on said shaft urges said support apart from said pinion and against a fastening member of the overload means adjacent the lower end of said shaft.

5. A harrow as claimed in claim 4, wherein said overload means comprises a lower plate and a sleeve portion that is splined to said shaft, said support being rotatably mounted on the sleeve portion and said plate being fitted into a recess at the lower support side to prevent relative rotation between said shaft and the support.